United States Patent
Jordan, Jr. et al.

(10) Patent No.: US 9,285,294 B2
(45) Date of Patent: Mar. 15, 2016

(54) MOBILE ASSET DATA RECORDER AND TRANSMITTER

(71) Applicants: Lawrence B Jordan, Jr., Bolingbrook, IL (US); Lisa A. Matta, Plainfield, IL (US)

(72) Inventors: Lawrence B Jordan, Jr., Bolingbrook, IL (US); Lisa A. Matta, Plainfield, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 16 days.

(21) Appl. No.: 13/861,826

(22) Filed: Apr. 12, 2013

(65) Prior Publication Data

US 2013/0274954 A1    Oct. 17, 2013

Related U.S. Application Data

(60) Provisional application No. 61/624,142, filed on Apr. 13, 2012.

(51) Int. Cl.
| | |
|---|---|
| *G06F 17/00* | (2006.01) |
| *G01M 17/08* | (2006.01) |
| *G07C 5/08* | (2006.01) |
| *G01B 21/02* | (2006.01) |
| *G01B 21/22* | (2006.01) |
| *G01C 19/00* | (2013.01) |
| *G01C 25/00* | (2006.01) |
| *G01F 23/28* | (2006.01) |
| *G01H 1/00* | (2006.01) |
| *G01P 15/00* | (2006.01) |
| *G01S 19/25* | (2010.01) |
| *H04N 1/21* | (2006.01) |

(52) U.S. Cl.
CPC .............. *G01M 17/08* (2013.01); *G01B 21/02* (2013.01); *G01B 21/22* (2013.01); *G01C 19/00* (2013.01); *G01C 25/00* (2013.01); *G01F 23/28* (2013.01); *G01H 1/00* (2013.01); *G01P 15/00* (2013.01); *G01S 19/252* (2013.01); *G06F 17/00* (2013.01); *G07C 5/0866* (2013.01); *H04N 1/2133* (2013.01)

(58) Field of Classification Search
CPC ...... G06F 17/00; G07C 5/0866; G01B 21/02; G01S 19/252; G01P 15/00; G01H 1/00
IPC  G01C 25/00, 19/00; G01B 21/22; G01M 17/08
See application file for complete search history.

(56) References Cited

U.S. PATENT DOCUMENTS

| | | | |
|---|---|---|---|
| 4,815,323 | A | 3/1989 | Ellinger et al. |
| 5,223,844 | A | 6/1993 | Mansell |
| 5,433,111 | A | 7/1995 | Hershey |
| 5,475,597 | A | 12/1995 | Buck |

(Continued)

*Primary Examiner* — Mussa A Shaawat
(74) *Attorney, Agent, or Firm* — Mercedes V. O'Connor; Howard B. Rockman (57) ABSTRACT

An acceleration-based mobile asset data recorder and transmitter equipped with a wireless processing unit, an event recorder, a digital video recorder, a fuel level sensor, and an inertial navigation sensor board. The inertial navigation sensor board includes a 3-axis gyroscope, a 3-axis accelerometer, a 3-axis magnetometer, and a microcontroller. The data recorder and transmitter allows for automatic orientation, automatic compass calibration, fuel compensation with pitch and roll, emergency brake application with impact detection, rough operating condition detection, engine running detection, and inertial navigation of a mobile asset. Users can use the normal operation of their mobile assets to locate and alert, in real-time, areas where their assets are encountering rough operating environments, to provide for quicker emergency response, and to validate the effectiveness of repairs and rerouting.

31 Claims, 6 Drawing Sheets

(56) References Cited

U.S. PATENT DOCUMENTS

| | | |
|---|---|---|
| 5,579,013 A | 11/1996 | Hershey |
| 5,719,771 A | 2/1998 | Buck |
| 5,754,956 A | 5/1998 | Abreu |
| 6,088,635 A | 7/2000 | Cox |
| 6,122,959 A | 9/2000 | Hoshal |
| 6,246,933 B1 | 6/2001 | Bague |
| 6,373,403 B1 | 4/2002 | Korver et al. |
| 6,389,340 B1 | 5/2002 | Rayner |
| 6,449,540 B1 | 9/2002 | Rayner |
| 6,542,076 B1 * | 4/2003 | Joao .................. 340/539.14 |
| 6,615,656 B1 | 9/2003 | Breed |
| 6,681,160 B2 | 1/2004 | Bidaud |
| 6,701,276 B2 | 3/2004 | Kueblbeck et al. |
| 7,039,507 B2 | 5/2006 | Hagenbuch |
| 7,164,975 B2 | 1/2007 | Bidaud |
| 7,527,288 B2 | 5/2009 | Breed |
| 7,536,457 B2 | 5/2009 | Miller |
| 7,539,596 B2 | 5/2009 | Zoll |
| 7,765,039 B1 | 7/2010 | Hagenbuch |
| 7,768,548 B2 | 8/2010 | Silvernail |
| 7,819,003 B2 | 10/2010 | Breed |
| 7,853,412 B2 | 12/2010 | Xia |
| 7,965,312 B2 | 6/2011 | Chung |
| 8,014,917 B2 | 9/2011 | Hagenbuch |
| 8,054,168 B2 | 11/2011 | Mccormick |
| 8,060,282 B2 | 11/2011 | Breed |
| 2002/0101509 A1 | 8/2002 | Slomski |
| 2002/0121969 A1* | 9/2002 | Joao .................. 340/425.5 |
| 2003/0016130 A1* | 1/2003 | Joao .................. 340/539 |
| 2003/0067541 A1* | 4/2003 | Joao .................. 348/148 |
| 2003/0071899 A1* | 4/2003 | Joao .................. 348/148 |
| 2003/0135327 A1 | 7/2003 | Levine |
| 2003/0193404 A1* | 10/2003 | Joao .................. 340/825.71 |
| 2003/0206102 A1* | 11/2003 | Joao .................. 340/539.1 |
| 2004/0122569 A1 | 6/2004 | Bidaud |
| 2004/0160319 A1* | 8/2004 | Joao .................. 340/539.1 |
| 2005/0248444 A1* | 11/2005 | Joao .................. 340/426.13 |
| 2006/0013453 A1 | 1/2006 | Schneider et al. |
| 2006/0089790 A1 | 4/2006 | Dupuis |
| 2007/0124076 A1 | 5/2007 | Ockerse et al. |
| 2008/0195261 A1 | 8/2008 | Breed |
| 2008/0195265 A1 | 8/2008 | Searle |
| 2008/0319606 A1 | 12/2008 | Fortson |
| 2009/0021395 A1 | 1/2009 | Maesono et al. |
| 2009/0157255 A1 | 6/2009 | Plante |
| 2011/0202305 A1 | 8/2011 | Willis et al. |
| 2011/0217123 A1* | 9/2011 | Jewell et al. .................. 405/158 |

* cited by examiner

MOBILE ASSET DATA RECORDER AND TRANSMITTER

This application claims priority to U.S. provisional patent application Ser. No. 61/624,142, filed on Apr. 13, 2012, to the extent provided by law.

BACKGROUND OF THE INVENTION

1. Field of the Invention

The present invention generally relates to equipment used in high value assets and particularly, to event and data recorder systems used in high value assets.

2. Description of the Prior Art

High value assets such as locomotives, mining, cargo, marine and military vehicles and vessels typically employ an onboard data acquisition and logging device, similar to a "black box" on airplanes. A typical onboard data acquisition and logging device, or an event/data recorder, comprises digital and analog inputs as well as pressure switches and pressure transducers which record data from various onboard sensor devices. These event/data recorders log a variety of system parameters used for incident investigation, crew performance evaluation, fuel efficiency analysis, maintenance planning, and predictive diagnostics. Recorded data may include such parameters as speed, distance traveled, location, fuel level, engine revolutions per minute (RPM), fluid levels, operator controls, pressures, and ambient conditions. In addition to the basic event and operational data, video and audio event/data recording capabilities are also deployed on many of these same mobile assets.

The primary objects of the present invention are to provide automatic collision detection, to reduce loss due to rough switching and train operations, to reduce fuel costs by eliminating excess idle, to enhance positioning accuracy, to improve over-the-road fuel accuracy, and to provide real-time track monitoring.

A further object of the present invention is remote accident alerting combining collision detection, roll-over detection, video and logging of operator actions before and after incidents to provide complete incident analysis.

Another object of the present invention is using accelerometer-based pitch and roll measurements to provide accurate liquid levels in mobile fuel storage tanks.

A further object of the present invention is the use of a non-intrusive accelerometer to determine the running/not-running state of an engine and auxiliary loads on that engine.

Another object of the present invention is the use of accelerometer data combined with logged operator actions and GPS location data to precisely locate rough operating environment, such as bad track, rough seas, and poor roads.

Yet another object of the present invention is the use of a high accuracy GPS, a 3-axis digital accelerometer, a digital compass and a 3-axis digital gyroscope combined to provide dead reckoning based arrival and departure notifications for mobile assets in conditions where no GPS signal is available, such as under canopies or overhangs at stations and docks.

SUMMARY OF THE INVENTION

The acceleration-based mobile asset data recorder and transmitter of an embodiment of the present invention used on locomotives comprises the operational integration of nine components. The components are an event recorder similar to a black box on airplanes, a locomotive digital video recorder, a fuel level sensor, fuel level sensor software, a wireless processing unit, an inertial navigation sensor board, firmware, system software, and the system encompassing these components. The inertial navigation sensor board includes a 3-axis digital gyroscope, a 3-axis digital magnetometer, a 3-axis digital accelerometer, and a micro-controller. The gyroscope is used for measuring the angular acceleration and deceleration of the asset, the magnetometer is used for measuring magnetic fields, the accelerometer is used for measuring linear accelerations and decelerations, and the micro-controller is used for processing data and communicating between the sensors and the wireless processing unit.

The mobile asset data recorder and transmitter performs seven functions: automatic orientation, automatic compass calibration, fuel compensation with pitch and roll, emergency brake with impact detection, rough operating condition detection, engine running detection and inertial navigation (dead reckoning).

Automatic collision detection alerts appropriate personnel when an emergency brake application occurs and can instantly determine if a collision coincides with the braking event. The mobile asset data recorder and transmitter provides immediate notification of collision severity including an indication of locomotive derailment or rollover event.

Rough operating condition detection reduces loss due to rough switching and train operations. It provides alerts and summary reports when high energy impacts are detected during switching operations. It also detects excessive slack-action, allowing supervisors to continuously assess and improve train operations. This enables the reduction of lading and equipment damage by identifying unsafe trends and allowing users to take immediate corrective action. Continuous monitoring of track conditions and over the road monitoring of vibration levels alert track maintenance personnel to the precise location of rough track or switches which may need inspection and repair.

Accelerometer-based engine running detection may be used as a backup source if the engine running signal is not already accessible from other onboard systems, as a means of reducing fuel costs by eliminating excess idle. It also improves over the road fuel accuracy by compensating for locomotive tilt due to grade and super elevation.

Fuel compensation with pitch and roll improves fuel reporting accuracy. It provides a simple, universal and non-intrusive method of determining if the engine is running while the locomotive is stopped. Increased accuracy provides enhanced real-time business intelligence to support strategic initiatives such as smart fueling, burn-rate analysis, fuel reconciliation and emissions monitoring.

Inertial navigation, or dead reckoning, enhances positioning accuracy. It augments the wireless processing unit's high accuracy differential GPS with sophisticated dead reckoning when inside shop buildings, stations, tunnels or any location where GPS signals are not available. This provides highly accurate station arrival and departure times, and the precise positioning and locomotive orientation within shop areas increases operational efficiency by improving shop planning and work flow.

BRIEF DESCRIPTION OF THE DRAWINGS

The present invention is further described with reference to the accompanying drawings in which.

DETAILED DESCRIPTION OF THE ILLUSTRATED EMBODIMENTS

Figure 6:
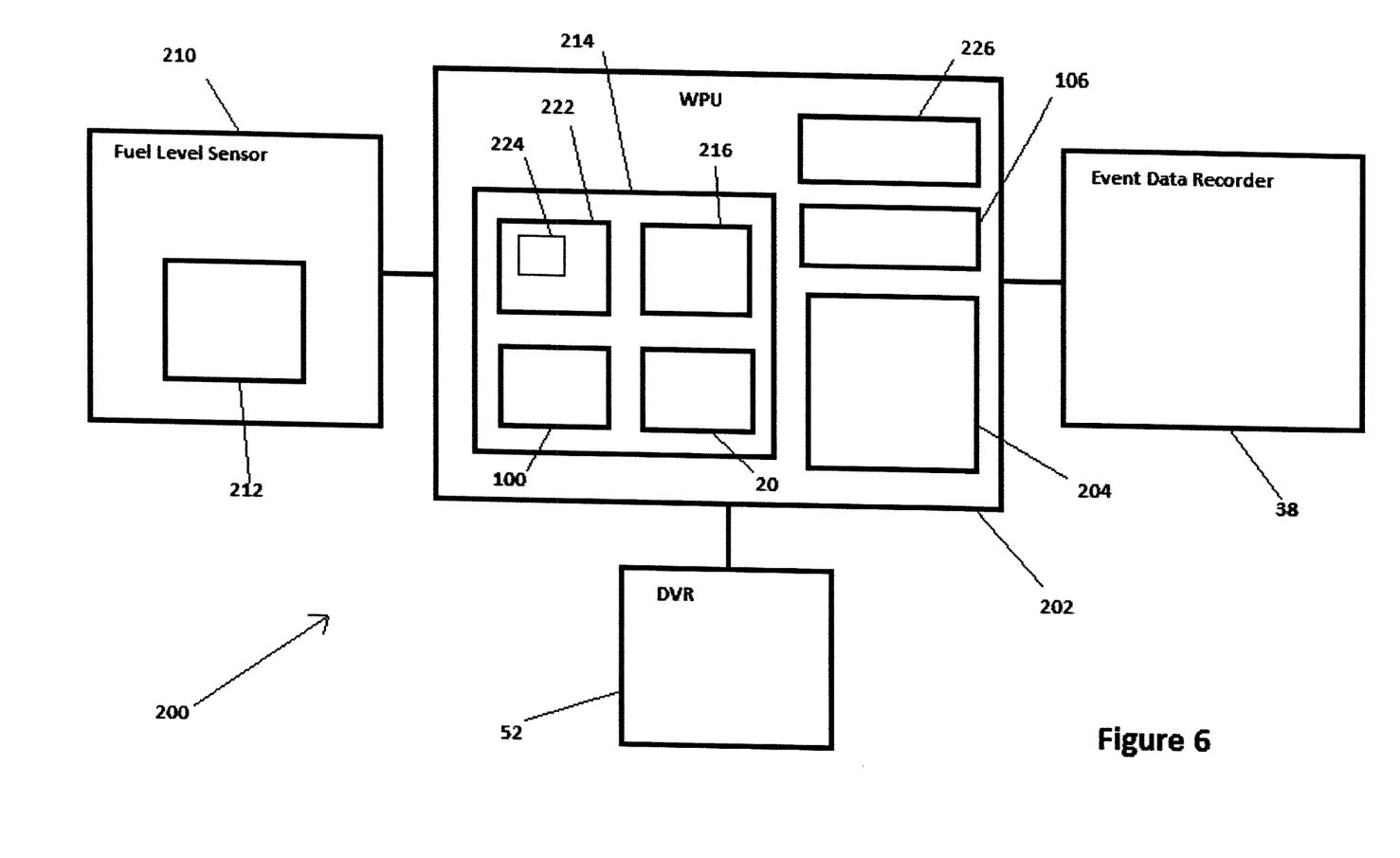
FIG. 6 is a diagram showing the system components of an embodiment of the mobile asset data recorder and transmitter of the present invention.

The mobile asset data recorder and transmitter system of the present invention and its components are shown in FIG. 6. The mobile asset data recorder and transmitter system 200 consists of ten interrelated components: an event data recorder 38, a locomotive digital video recorder (DVR) 52, a fuel level sensor 210, fuel level sensor software 212, a WPU 202, an inertial navigation sensor board 214, global positioning system (GPS) 106, firmware 224, system software 226, and the system 200 itself. Installing the WPU 202 onto an asset, such as a locomotive, consists of mounting the WPU 202 and connecting it externally to an event data recorder 38, a locomotive digital video recorder 208 and any additional available condition sensing devices.

The event data recorder 38, similar to a black-box on airplanes, is an onboard data logging device for locomotives. A typical event data recorder 38 consists of digital and analog inputs as well as pressure switches and pressure transducers which record data from various onboard devices, such as throttle position, wheel speed, and emergency brake application. The WPU 202 receives and processes data from the event data recorder 38 once per second over an external serial connection.

The locomotive digital video recorder (DVR) 52, similar to a television DVR, is an onboard video recording device. The DVR 52 comes equipped with a forward facing camera and a microphone. The camera is mounted at such orientation that it sees and records what the engineer sees. The WPU 202 accesses the locomotive's DVR 52 via an external Ethernet connection to download the video from the hard drive before, during, and after an event.

The fuel level sensor 210 is a sensor that is used to measure the amount of fuel inside the fuel tank. The fuel level sensor 210 used in the present invention is an ultrasonic level sensor which uses ultrasonic acoustic waves to determine the distance between the sensor head and the fuel level. The sensor 210 is mounted on top of the fuel tank with known dimensions and mounting location. The WPU 202 accesses this data via an external serial connection.

The fuel level sensor software 212 takes the distance from the fuel level to the sensor 210 with fuel tank geometry and converts this data into a steady fuel volume. This is done by applying mathematical filtering to reduce noise from sloshing and ultrasonic behaviors of the tank. The software 226 also uses smart algorithms to determine refuel and fuel drop events.

The WPU 202 of the illustrated embodiment is a ruggedized onboard computer running Windows XP embedded specifically for industrial applications. It has many different features that can be installed to customize the product for specific customer needs. The WPU 202 has the ability to communicate with a wide variety of onboard systems, including, but not limited to, vehicle control systems, event data recorders, DVRs, fuel level sensors, and engine controllers. The WPU 202 has the ability to communicate over a wide variety of protocols, including, but not limited to, RS 232, RS 422, RS 485, CAN Bus, LAN, WiFi, cellular, and satellite.

The inertial navigation sensor board (Board) 214 is a hardware upgrade for the WPU 202. It is installed internally and communicates with the WPU 202 via an internal serial port. The board 214 consists of four components: a 3-axis gyroscope 216, a 3-axis magnetometer 100, a 3-axis accelerometer 20, and a microcontroller 222. The gyroscope 216 is used for measuring angular accelerations, the magnetometer 100 is used for measuring magnetic fields, the accelerometer 20 is used for measuring linear accelerations and decelerations, and the microcontroller 222 is used for processing data and communicating between the sensors and the WPU 202.

The firmware 224 runs on the Board's 214 microcontroller 222. The firmware 224 constantly calculates pitch and roll using the 3-axis acceleration 20 data. By comparing the 3-axis acceleration data to programmatically defined thresholds and durations, the firmware 224 can determine if a trigger event occurs and if so, sends a trigger event message to the WPU 202. Every second, the firmware 224 sends a periodic data message containing a predefined set of values to the WPU 202. This data is used for, but not limited to, determining heading, internal ambient temperature, and angular accelerations.

The system software 226 is an application running on the WPU 202. This application talks directly to the GPS 106 and Board 214 to gather related data. In addition to this data, the system software 226, like all other applications on the WPU 202, uses a standard inter-process communication protocol to gather data from other software applications. These other software applications are running on the WPU 202 and communicate to other devices (DVR 52, event data recorder 38, etc.) which are physically connected to the WPU 202. By using all the data gathered, the system software 226 can compare the data to predefined thresholds and durations to determine if specific events have occurred.

The system 200 consists of a WPU 202 with a Board 214, firmware 224, and system software 226 installed and an event data recorder 38, a DVR 52, and a fuel level sensor 210. The system software 226 runs on the WPU 202, constantly correcting fuel levels and checking for event messages from the Board 214 or event data recorder 38 to take action.

The mobile asset data recorder and transmitter system 200 (FIG. 6) of the present invention performs seven functions: automatic orientation, automatic compass calibration, emergency brake with impact detection, fuel compensation with pitch and roll, rough operating condition detection, engine running detection and inertial navigation (dead reckoning). Each of these seven functions factors in signals generated by the 3-axis accelerometer 20.

Auto orientation is used to correlate the axes of the WPU 202 to the axes of the locomotive so that the values measured by the sensors correspond to the locomotive's axes. This process is accomplished by the software 226 and firmware 224. Due to different electronic environments on locomotives, the compass needs to be calibrated on a per locomotive basis. The software uses the WPU's 202 GPS 106 (FIG. 5, 6) to determine the heading of the locomotive. It then takes measurements from the magnetometer 100 and stores them in the corresponding position of an array. The array consists of 360 positions, one for every degree of heading. Using these values, the WPU's 202 software 226 can correct for the locomotive's own magnetic fields and only detect the change due to the earth's magnetic field.

Figure 1:
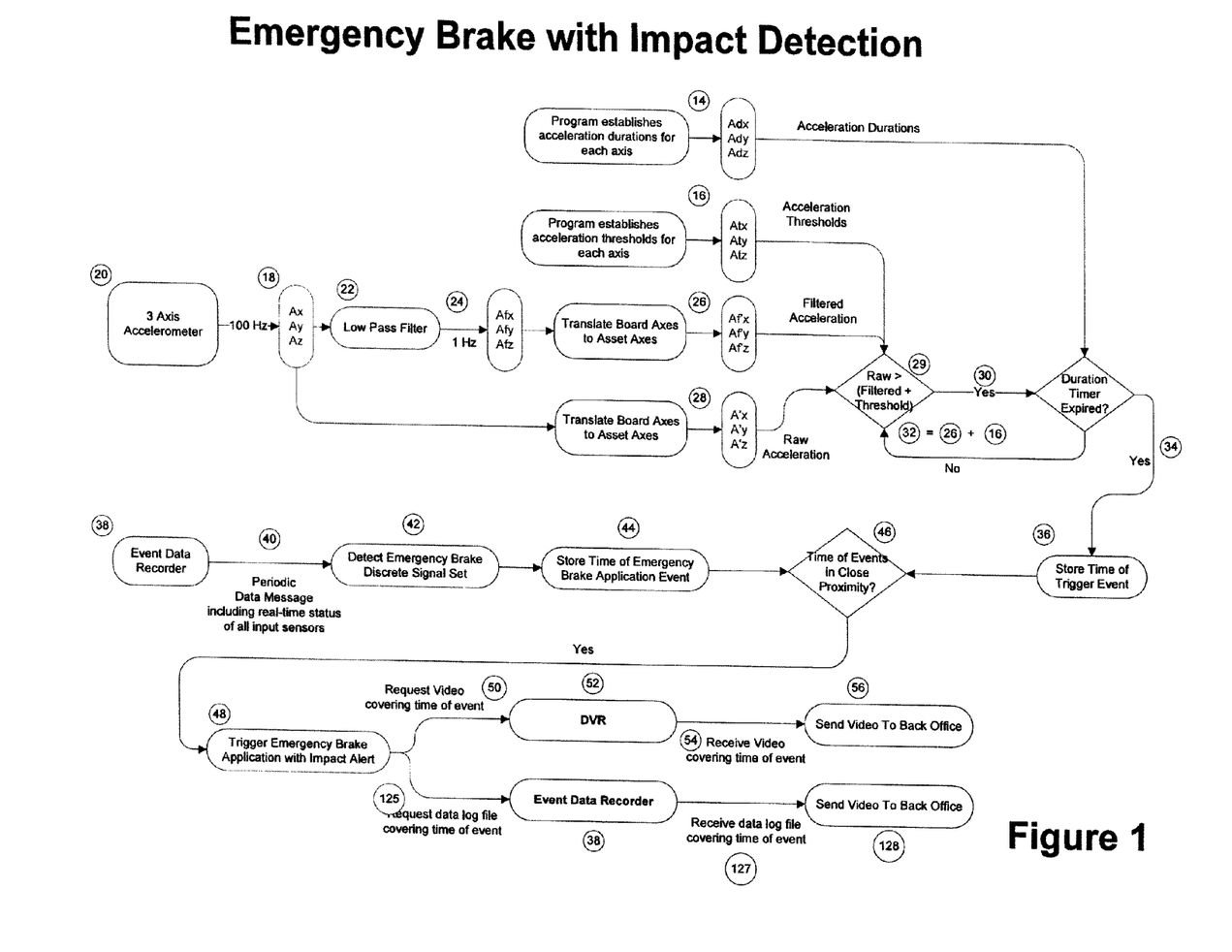
FIG. 1 is a flow diagram showing the operation of the emergency brake with impact detection system of the present invention.

FIG. 1 depicts a flow diagram of a method application for emergency brake with impact detection. The WPU 202 (FIG. 6) software 226 (FIG. 6) sends initialization commands to the firmware 224 (FIG. 6) to establish acceleration durations in each axis (Adx, Ady, Adz) 14 to be used for triggering events. These durations are stored onboard in the device embodying system 200. The WPU 202 software 226 also sends initialization commands to the firmware 224 to establish acceleration thresholds in each axis (Atx, Aty, Atz) 16 to be used for triggering events. These thresholds are stored onboard in the device embodying system 200 (FIG. 6). The microcontroller 222 (FIG. 6) pulls the raw 3-axis acceleration (Ax, Ay, Az) 18 data from the accelerometer 20 at a rate of 100 Hz. A low pass filter 22 is applied to the raw acceleration values (Ax, Ay, Az) 18, which results in filtered acceleration values (Afx, Afy, Afz) 24. The Board 214 (FIG. 6) axes of the filtered acceleration values (Afx, Afy, Afz) 24 are translated to asset axes (Af'x, Af'y, Af'z) 26. The Board 214 values of the raw values (Ax, Ay, Az) 18 are translated to asset axes (A'x, A'y, A'z) 28. The filtered values of the asset axes (Af'x, Af'y, Af'z) 26 are added to the established thresholds for each axis (Atx, Aty, Atz) 16, and this added threshold (Af'tx, Af'ty, Af'tz) 32 is then continually compared 29 to the raw acceleration in the asset axes (A'x, A'y, A'z) 28. When the raw values (A'x, A'y, A'z) 28 exceed the thresholds 32 in one or more axes, a timer is activated 30. When a raw value 28 no longer exceeds the thresholds 32 in a specific axis 30, the duration that the raw value 28 exceeded the thresholds 32 is evaluated to determine if the duration exceeds the specified duration for that axis (Adx, Ady, Adz) 14. If the event duration was longer than 34 the duration established (Adx, Ady, Adz) 14, a trigger event is stored 36, including specifics on which axis, duration of the event, and time of the trigger event. In parallel with this monitoring, the onboard software 226 (FIG. 6) is receiving periodic data messages 40 from an onboard event data recorder 38, which is monitoring real-time status of various input sensors. The onboard software 226 monitors the periodic data messages 40 and detects when the periodic data message 40 indicates an emergency brake application discrete signal has occurred 42. The onboard software 226 stores the time 44 that the emergency brake application event occurred. If the onboard software 226 stores either the trigger event 36 or the emergency brake time 44, the onboard system software 226 will check the time stamp of each event to see if the latest two events logged, from the trigger event 36 or emergency brake application 44, are in close proximity 46. If it is detected that the events occurred in close proximity 46, the onboard software 226 will trigger an emergency brake application with impact alert 48 and will request a digital video recorder download 50 covering the time of the event from the onboard DVR 52 and will request the data log file covering the time of the event 125 from the event data recorder 38. The onboard software 226 receives the downloaded video covering the time of the event 54 and the data log file covering the time of the event 127 and sends both to the back office 56/128.

Users will receive alerts indicating the actual force of the collision and if the collision resulted in a rollover or derailment. This, coupled with GPS location, video and immediate access to event recorder information, allows users to precisely relay the severity and scope of the incident to first responders as they are en route to an incident.

Figure 2:
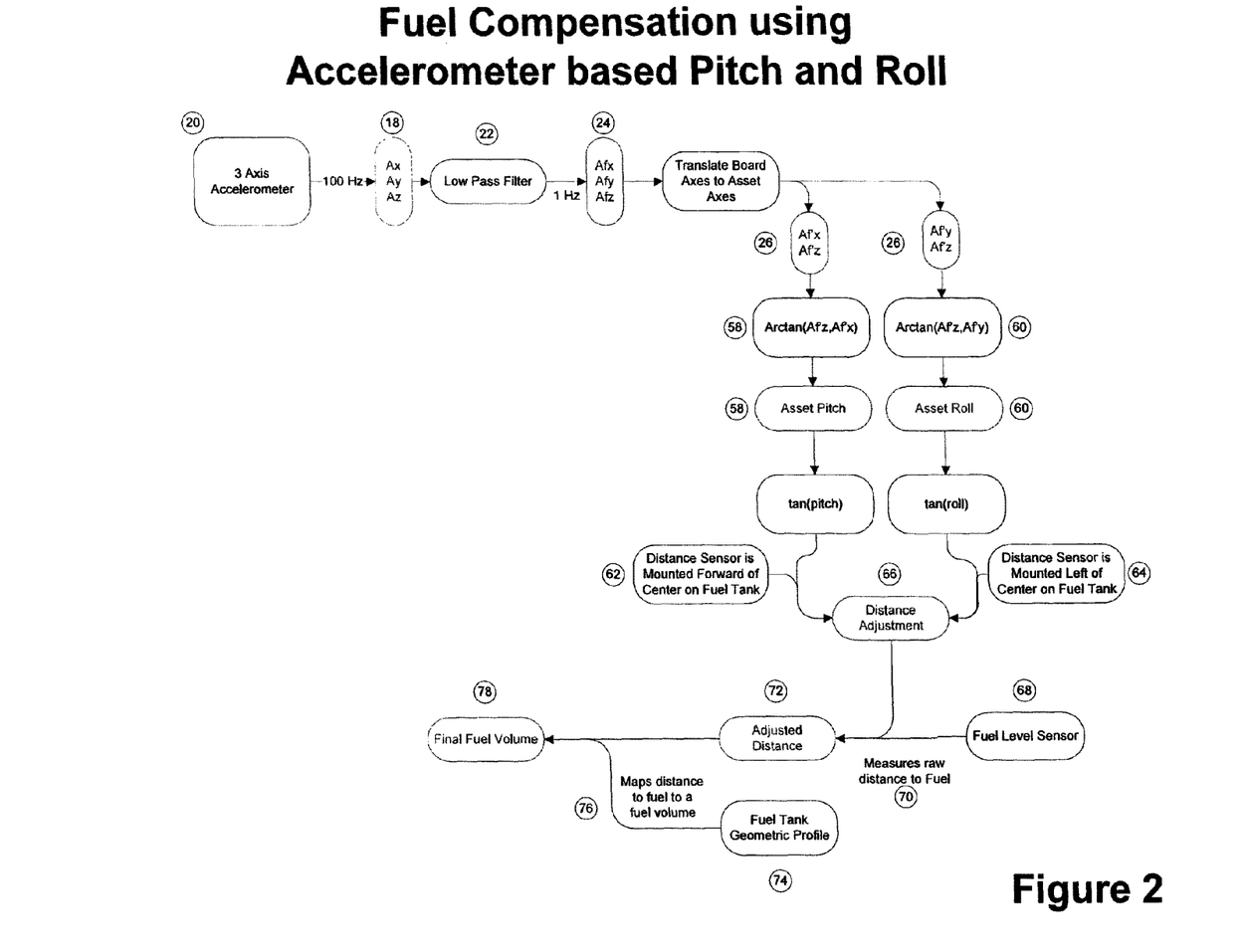
FIG. 2 is a flow diagram showing the operation of the fuel compensation using accelerometer-based pitch and roll of the present invention.

FIG. 2 depicts a flow diagram of a method application for fuel compensation using accelerometer-based pitch and roll. The WPU 202 (FIG. 6) software 226 (FIG. 6) pulls the raw 3-axis acceleration data (Ax, Ay, Az) 18 from the accelerometer 20 at a rate of 100 Hz. A low pass filter 22 is applied to the raw data (Ax, Ay, Az) 18, which results in filtered acceleration values (Afx, Afy, Afz) 24. The Board 214 (FIG. 6) axes of the filtered values (Afx, Afy, Afz) 24 are translated to asset axes (Af'x, Af'y, Af'z) 26. The asset's pitch 58 is the arc tangent of the asset's filtered x-axis and the asset's filtered z-axis:

$$\arctan\left(\frac{asset'sx - axis}{asset'sz - axis}\right).$$

The asset's roll 60 is the arc tangent of the asset's filtered y-axis and the asset's filtered z-axis:

$$\arctan\left(\frac{asset'sy - axis}{asset'sz - axis}\right).$$

For each model of asset the system is installed upon, the specific location of the fuel sensor mounting is captured. Specifically, the distance the sensor is mounted forward of the center of the fuel tank 62 is recorded. In addition, the distance the fuel sensor is mounted left of the center of the fuel tank 64 is also recorded.

The distance forward of center 62 is combined with the tangent of the asset's pitch 58 to obtain a first fuel distance adjustment. The distance left of center 64 is combined with the tangent of the asset's roll 60 to obtain a second fuel distance adjustment. The first and second fuel distance adjustments are combined to provide a single fuel distance adjustment 66. The onboard distance level sensor records the distance from the top of the tank to the fuel level present in the onboard fuel tank. The raw distance to the fuel 70 from the fuel sensor 68 is combined with the distance adjustment 66 to create an adjusted distance 72. The adjusted distance 72 is combined with a previously defined fuel tank geometric tank profile 74, which maps a distance to fuel value to a fuel volume 76. This results in a final fuel volume 78, which is adjusted as the asset travels through various terrains in which the pitch 58 and roll 60 are changing, compensating for the movement of the liquid within the tank of an operating mobile asset.

Figure 3:
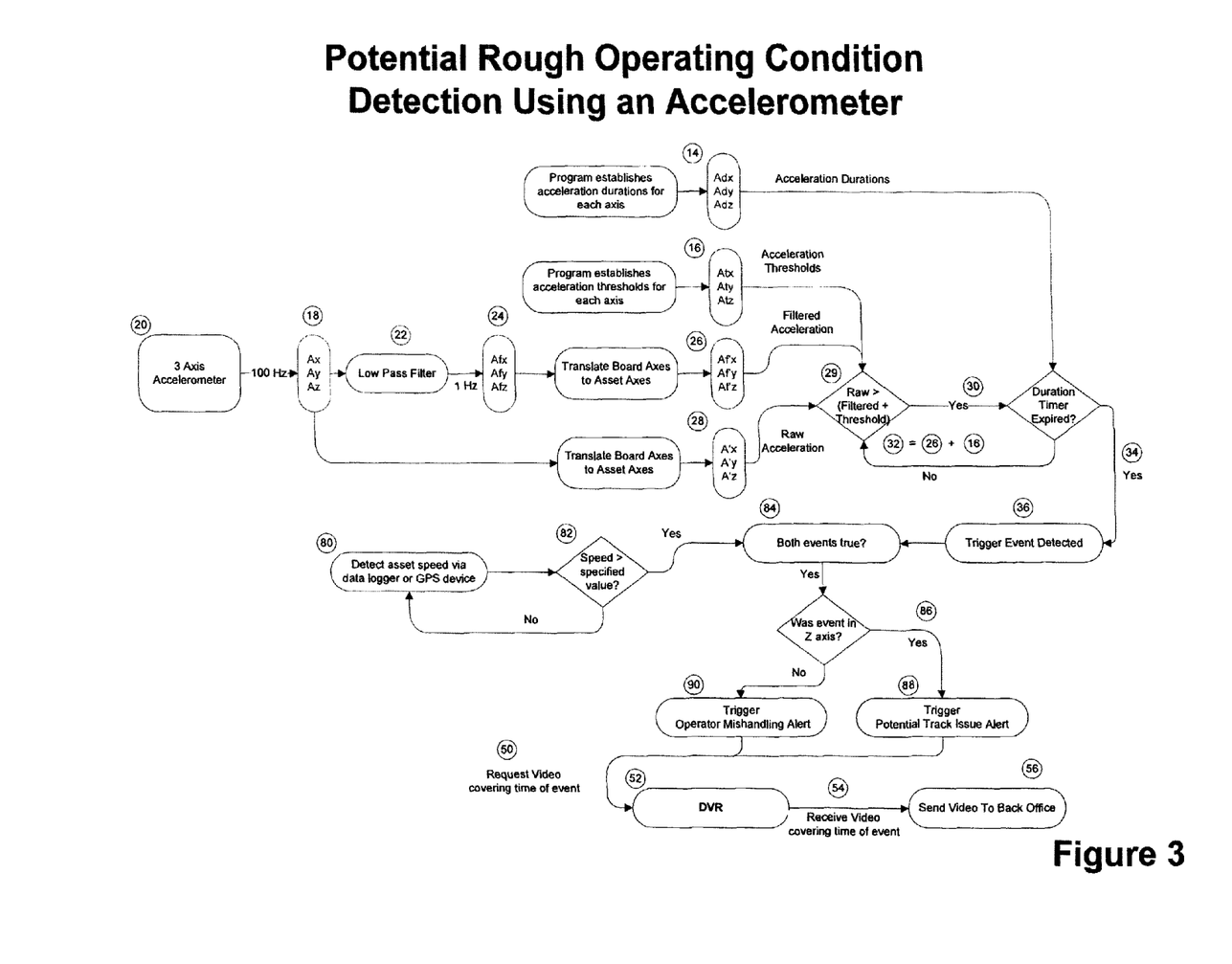
FIG. 3 is a flow diagram showing the operation of the potential rough operating condition detection using the accelerometer of the present invention.

FIG. 3 depicts a flow diagram of a method application for potential rough operating condition detection using an accelerometer. The WPU 202 (FIG. 6) software 226 (FIG. 6) sends initialization commands to the firmware 224 (FIG. 6) to establish acceleration durations in each axis (Adx, Ady, Adz) 14 to be used for triggering events. These durations are stored onboard, in the device. The software 226 also sends initialization commands to the firmware 224 to establish acceleration thresholds in each axis (Atx, Aty, Atz) 16 to be used for triggering events. These durations are stored onboard, in the device. The microcontroller 222 (FIG. 6) pulls the raw 3-axis acceleration data (Ax, Ay, Az) 18 from the accelerometer 20 at a rate of 100 Hz. A low pass filter 22 is applied to the raw acceleration values 18, which results in filtered acceleration values (Afx, Afy, Afz) 24. The Board 214 (FIG. 6) axes of the filtered values 24 are translated to asset axes (Af'x, Af'y, Af'z) 26 and the Board 214 axes of the raw values 18 are translated to asset axes (A'x, A'y, A'z) 28. The filtered values of the asset axes (Af'x, Af'y, Af'z) 26 are added to the established thresholds for each axes (Atx, Aty, Atz) 16, and then this added threshold (Af'tx, Af'ty, Af'tz) 32 is continually compared 29 to the raw acceleration in the asset axes (A'x, A'y, A'z) 28. When a raw value 28 exceeds the threshold 32 in one or more axes, a timer is activated 30. When a raw value 28 no longer exceeds the threshold 32 in specific axis, the duration that the raw value 28 exceeded the threshold 32 is evaluated to determine if it exceeds the specified duration for that axis (Adx, Ady, Adz) 14. If the event duration was longer than the duration established for that axis (Adx, Ady, Adz) 14, a trigger event is stored 36, including specifics on which axis, duration of the event, and time of the trigger event.

Figure 5:
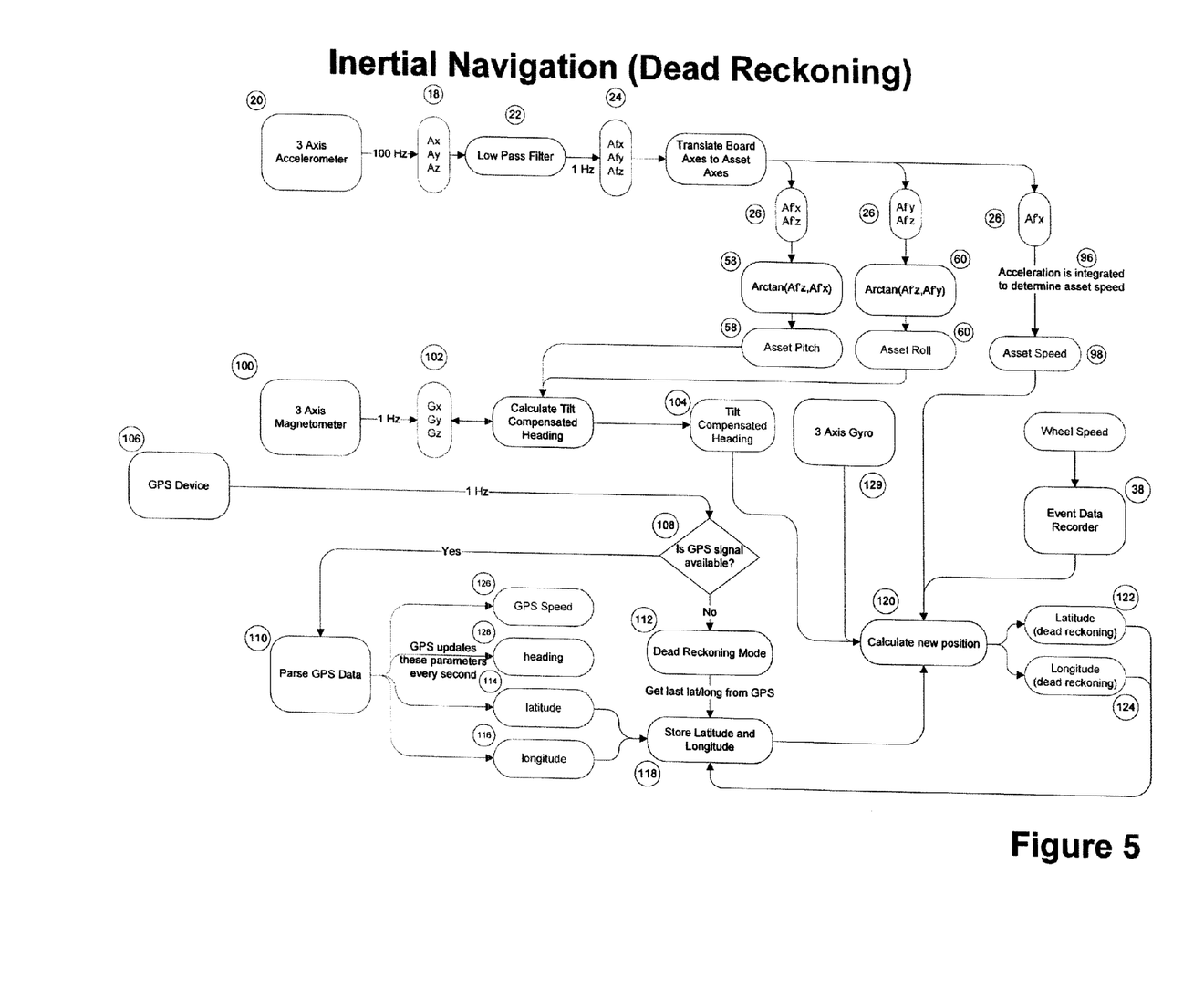
FIG. 5 is a flow diagram showing the operation of the inertial navigation, and dead reckoning, system of the present invention.

In parallel with this monitoring, the onboard software 226 (FIG. 6) is monitoring asset speed via periodic messages from the onboard event data logger 38 (FIG. 1) and/or from an onboard GPS device 106 (FIG. 5, 6). The onboard software 226 monitors the asset speed 80 and detects when it exceeds a specified value 82. If both the speed 80 exceeds a specified value 82 and a trigger event stored 36 occur at the same time 84, the onboard system software 226 will check which axis the event was triggered in. If the event was triggered in the z-axis 86, the system will log a potential track issue alert 88. If the event was triggered in the x- or y-axis, the system will log an operator mishandling alert 90. If either a potential track issue alert 88 or an operator mishandling alert 90 occurs, the onboard software 226 will request a digital video recorder download 50 covering the time of the event from the onboard DVR 52. The onboard software 226 receives the downloaded video 54 and sends it to the back office 56.

Users can now use the normal operation of their mobile assets to precisely locate and alert, in real-time, areas where their assets are encountering rough operating environment, such as bad track/switch, rough seas, and poor roads. The user will receive an alert, a still or video image and the crucial operational black-box data immediately upon identification of a rough operating environment. Repair teams can respond to the exact location of the bad road or track. Marine routes can be adjusted to avoid bar currents or choppy waters. The effectiveness of any repairs or rerouting can be validated when the next mobile asset data recorder and transmitter system equipped asset traverses any previously flagged area.

Figure 4:
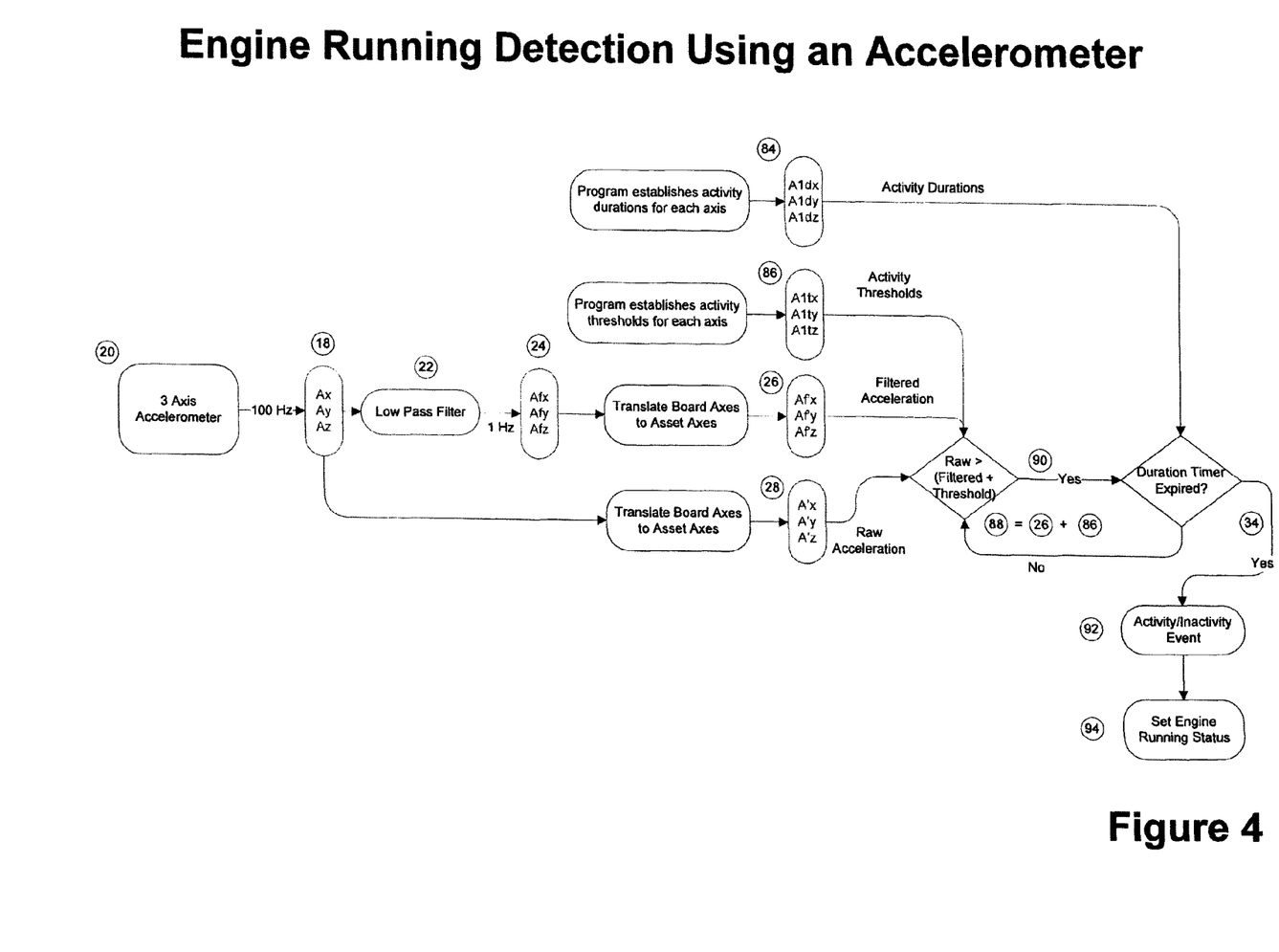
FIG. 4 is a flow diagram showing the operation of the engine running detection system using an accelerometer of the present invention.

FIG. 4 depicts a flow diagram of a method application for engine running detection using an accelerometer. The WPU 202 (FIG. 6) software 226 (FIG. 6) sends initialization commands to the firmware 224 (FIG. 6) to establish activity/inactivity durations in each axis (A1dx, A1dy, A1dz) 84 to be used for triggering events. These durations are stored onboard, in the device. The WPU 202 (FIG. 6) software 226 (FIG. 6) also sends initialization commands to the firmware 224 (FIG. 6) to establish activity/inactivity thresholds in each axis (A1tx, A1ty, A1tz) 86 to be used for triggering events. These durations are stored onboard, in the device. The microcontroller 222 (FIG. 6) pulls the raw 3-axis acceleration data (Ax, Ay, Az) 18 from the accelerometer 20 at a rate of 100 Hz. A low pass filter 22 is applied to the raw acceleration values (Ax, Ay, Az) 18, which results in filtered acceleration values (Afx, Afy, Afz) 24. The Board 214 (FIG. 6) axes of the filtered values 24 are translated to asset axes (Af'z, Af'y, Af'z) 26 and the Board 214 axes of the raw values 18 are translated to asset axes (A'x, A'y, A'z) 28. The filtered values of the asset axes (Af'x, Af'y, Af'z) 26 are added to the established activity/inactivity thresholds for each axis (A1tx, A1ty, A1tz) 86 and then this added threshold (Af'1tx, Af'1ty, Af'1tz) 88 is continually compared to the raw acceleration in the asset axes (A'x, A'y, A'z) 28. When the raw value 28 exceeds the threshold 88 in one or more axes, a timer is activated 90. If the raw value 28 no longer exceeds the activity/inactivity threshold 88 in a specific axis, the duration that the raw value 28 exceeded the threshold 88 is evaluated to determine if it exceeds the specified duration for that axis (A1dx, A1dy, A1dz) 84. If the event duration was longer than the duration established for that axis (A1dx, A1dy, A1dz) 84, a trigger inactivity/activity event 34 is stored 92, including specifics on which axis, duration of the event, and time of the event trigger. The engine running status is updated 94 when activity/inactivity events are triggered.

FIG. 5 depicts a flow diagram of a method application for inertial navigation (dead reckoning). The microcontroller 222 (FIG. 6) pulls the raw 3-axis acceleration data (Ax, Ay, Az) 18 from the accelerometer 20 at a rate of 100 Hz. A low pass filter 22 is applied to the raw acceleration values (Ax, Ay, Az) 18, which results in filtered acceleration values (Afx, Afy, Afz) 24. The Board 214 (FIG. 6) axes of the filtered values 24 are translated to asset axes (Af'x, Af'y, Af'z) 26. The asset's pitch 58 is the arc tangent of the asset's filtered x-axis and the asset's filtered z-axis:

$$\arctan\left(\frac{asset'sx - axis}{asset'sz - axis}\right).$$

The asset's roll 60 is the arc tangent of the asset's filtered y-axis and the asset's filtered z-axis:

$$\arctan\left(\frac{asset'sy - axis}{asset'sz - axis}\right).$$

Acceleration in the asset's x-axis is integrated 96 to calculate the asset's speed 98:

$$\int asset's\ acceleration_{x-axis}.$$

In parallel, the microcontroller 222 (FIG. 6) pulls 3-axis gauss data (Gx, Gy, Gz) 102 from the magnetometer 100 at 1 Hz. Using the magnetometer data 102 and the asset's pitch 58 and roll 60, a tilt compensated heading 104 is calculated. Also in parallel, the onboard GPS device 106 is providing location data updated at a 1 Hz frequency. The onboard software 226 determines if valid GPS data is available 108. If a GPS signal is available, the onboard software 226 will parse the data 110, into GPS speed 126, heading 128, latitude 114, and longitude 116 every second, and will store 118 the latitude 114 and longitude 116. If the GPS data is determined to not be available, the system 200 (FIG. 6) enters dead reckoning mode 112. In dead reckoning mode 112, the last known latitude 114 and longitude 116 are obtained from the GPS 106 and stored 118. Using the last known 118 latitude 114 and last longitude 116, along with the asset's speed 98, the wheel speed from the event recorder data 126, the tilt compensated heading 104 and the data 129 from the 3-axis gyroscope, a new position 120 is calculated. The new latitude 122 and the new longitude 124 positions are stored and used, and the process continues until valid GPS data is again available.

Users will receive precision departure and arrival alerts and logging in environments where GPS signals are blocked or partially blocked by overhangs and canopies. This system 200 (FIG. 6) allows users to define virtual 'trip wires,' even in areas where GPS devices are rendered useless due to RF signal loss or interference. The inertial navigation capabilities automate operator performance to a schedule matrix by alerting and logging the exact time an asset crosses a departure and arrival virtual 'trip wire' when a GPS signal cannot compute accurate location data.

The foregoing description of an illustrated embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for recording, processing and transmitting data from a mobile asset, comprising the steps of:
   a. at least one event data recorder, onboard the mobile asset, monitoring real-time status of at least one input sensor and logging data relating to the mobile asset;
   b. at least one digital video recorder, onboard the mobile asset, recording still images, video and acoustics in real-time;
   c. at least one inertial navigation sensor board onboard the mobile asset, said board comprising a microcontroller communicating with and processing data from a 3-axis accelerometer;
   d. reading an x-axis raw acceleration value, a y-axis raw acceleration value, and a z-axis raw acceleration value from the 3-axis accelerometer;
   e. filtering the x-axis raw acceleration value, y-axis raw acceleration value and the z-axis raw acceleration value into an x-axis filtered acceleration value, a y-axis filtered acceleration value, and a z-axis filtered acceleration value;
   f. translating the axes of the inertial navigation sensor board to the axes of the mobile asset and determining an x-axis translated raw acceleration value by translating the x-axis raw acceleration value to the axes of the mobile asset, determining a y-axis translated raw acceleration value by translating the y-axis raw acceleration value to the axes of the mobile asset, and determining a z-axis translated raw acceleration value by translating the z-axis raw acceleration value to the axes of the mobile asset; and
   g. translating the axes of the inertial navigation sensor board to the axes of the mobile asset and determining an x-axis translated filtered acceleration value by translating the x-axis filtered acceleration value to the axes of the mobile asset, determining a y-axis translated filtered acceleration value by translating the y-axis filtered acceleration value to the axes of the mobile asset, and determining a z-axis translated filtered acceleration value by translating the z-axis filtered acceleration value to the axes of the mobile asset.

2. The method of claim 1, further comprising the steps of:
   a. establishing an x-axis acceleration duration, a y-axis acceleration duration, and a z-axis acceleration duration;
   b. establishing an x-axis acceleration threshold, a y-axis acceleration threshold, and a z-axis acceleration threshold;
   c. storing the x-axis acceleration duration, the y-axis acceleration duration, and the z-axis acceleration duration;
   d, storing the x-axis acceleration threshold, the y-axis acceleration threshold, and the z-axis acceleration threshold;
   e. determining an x-axis filtered threshold value by adding the x-axis translated filtered acceleration value to the x-axis acceleration threshold;
   f. determining a y-axis filtered threshold value by adding the y-axis translated filtered acceleration value to the y-axis acceleration threshold;
   g. determining a z-axis filtered threshold value by adding the z-axis translated filtered acceleration value to the z-axis acceleration threshold; and
   i. continually comparing the x-axis filtered threshold value to the x-axis translated raw acceleration value, the y-axis filtered threshold value to the y-axis translated raw acceleration value, and the z-axis filtered threshold value to the z-axis translated raw acceleration value.

3. The method of claim 2, further comprising the steps of:
   a. activating a timer when at least one of the x-axis translated raw acceleration value exceeds the x-axis filtered threshold value, the y-axis translated raw acceleration value exceeds the y-axis filtered threshold value, and the z-axis translated raw acceleration value exceeds the z-axis filtered threshold value;
   b. determining a timer duration of the timer when at least one of the x-axis translated raw acceleration value does not exceed the x-axis filtered threshold value, the y-axis translated raw acceleration value does not exceed the y-axis filtered threshold value, and the z-axis translated raw acceleration value does not exceed the z-axis filtered threshold value, said timer duration comprising the duration that at least one of the x-axis translated raw acceleration value exceeded the x-axis acceleration filtered threshold value, the y-axis translated raw acceleration value exceeded the y-axis filtered threshold value, and the z-axis translated raw acceleration value exceeded the z-axis filtered threshold value;
   c. storing a trigger event when the timer duration exceeds at least one of the x-axis acceleration duration, the y-axis acceleration duration, and the z-axis acceleration duration;
   d. monitoring the event data recorder for at least one periodic data message;
   e. receiving at least one periodic data message from the event data recorder;
   f. detecting when the periodic data message indicates an emergency brake application discrete signal occurred; and
   g. storing at least one of a trigger event time when the trigger event occurred and a brake time and an emergency brake event when the emergency brake application discrete signal occurred.

4. The method of claim 3, further including the steps of:
   a. triggering an emergency brake application with an impact alert when the trigger event time and the brake time are in close temporal proximity;
   b. requesting a download of at least one of a still image file, an acoustic file, and a digital video from the onboard digital video recorder, said at least one of the still image file, the acoustic file, and the digital video recorded a predetermined time period prior to, during, and after at least one of the trigger event time and the brake time;
   c. receiving the at least one of the still image file, the acoustic file, and the digital video; and
   d. sending the data log file and the at least one of the still image file, the acoustic file, and the digital video to a back office in real time.

5. The method of claim 4, further comprising the step of:
   a. sending at least one alert indicating at least one of a GPS location, digital video, data from the event data recorder, actual force when a collision occurred, and a rollover alert and a derailment alert when at least one of a rollover and a derailment occurred as a result of said collision.

6. The method of claim 3, wherein the trigger event comprises storing specifics on the axes, the timer duration, and the trigger event time.

7. The method of claim 3, wherein the at least one periodic data message comprises at least one real-time status of the at least one input sensor.

8. The method of claim 1, further comprising the steps of:
a. at least one fuel level sensor measuring the amount of fuel inside a fuel tank;
d. calculating the mobile asset's pitch, wherein the mobile asset's pitch is determined by applying the equation:

$$\arctan\left(\frac{x - \text{axis translated filtered acceleration value}}{z - \text{axis translated filtered acceleration value}}\right);$$

e. calculating the mobile asset's roll, wherein the mobile asset's roll is determined by applying the equation:

$$\arctan\left(\frac{y - \text{axis translated filtered acceleration value}}{z - \text{axis translated filtered acceleration value}}\right);$$

f. determining a first distance the fuel sensor is mounted forward of the center of the fuel tank;
g. determining a second distance the fuel sensor is mounted left of the center of the fuel tank;
h. calculating a first fuel distance adjustment by combining the first distance with the tangent of the mobile asset's pitch;
i. calculating a second fuel distance adjustment by combining the second distance with the tangent of the mobile asset's roll;
j. calculating a third fuel distance adjustment by combining the first fuel distance adjustment with the second fuel distance adjustment;
k. determining a raw distance from the top of the tank to the fuel level present in the fuel tank;
l. calculating an adjusted distance by combining the raw distance with third fuel distance adjustment; and
m. calculating a final fuel volume by combining the adjusted distance with a fuel tank geometric tank profile.

9. The method of claim 2, further comprising the steps of:
a. at least one GPS sensor, onboard the mobile asset, receiving GPS signals from a global positioning system;
b. the at least one event data recorder, onboard the mobile asset, logging data relating to the mobile asset;
c. activating a timer when at least one of the x-axis translated raw acceleration value exceeds the x-axis filtered threshold value, the y-axis translated raw acceleration value exceeds the y-axis filtered threshold value, and the z-axis translated raw acceleration value exceeds the z-axis filtered threshold value;
d. determining the timer duration of the timer when at least one of the x-axis translated raw acceleration value does not exceed the x-axis filtered threshold value, the y-axis translated raw acceleration value does not exceed the y-axis filtered threshold value, and the z-axis translated raw acceleration value does not exceed the z-axis filtered threshold value, said timer duration comprising the duration that at least one of the x-axis translated raw acceleration value exceeded the x-axis filtered threshold value, the y-axis translated raw acceleration value exceeded the y-axis filtered threshold value, and the z-axis translated raw acceleration value exceeded the z-axis filtered threshold value;
e. storing a trigger event at a time when the timer duration exceeds at least one of the x-axis acceleration duration, the y-axis acceleration duration, and the z-axis acceleration duration;
f. receiving at least one periodic data message from the at least one of the event data recorder and the GPS sensor, said at least one periodic data message including a speed of the mobile asset; and
g. monitoring the speed of the mobile asset, wherein the asset's speed is determined by applying the equation:

$$\int \text{asset's acceleration}_{x\text{-axis translated filtered value}}.$$

10. The method of claim 9, further comprising the steps of:
a. determining which axis the trigger event was triggered in when the asset's speed exceeds a specified value and the trigger event was stored at the same time;
b. logging a potential track issue alert if when the trigger event was triggered in the z-axis; and
c. logging an operator mishandling alert if when the trigger event was triggered in one of the x-axis and the y-axis.

11. The method of claim 10, further comprising the step of:
a. sending alerts indicating any of rough operating environments, bad tracks and switches, rough seas, poor roads, repaired routes, GPS location, video and access to event recorder information.

12. The method of claim 9, wherein the trigger event comprises storing specifics on which axis, duration of the event, and time of the trigger event.

13. The method of claim 9, wherein the data message comprises the real-time status of the at least one input sensor.

14. The method of claim 1, further comprising the steps of:
a. establishing an x-axis activity duration, a y-axis activity duration, and a z-axis activity duration;
b. storing the x axis activity duration, y-axis activity duration, and z-axis activity duration;
c. establishing an x-axis activity threshold, a y-axis activity threshold. and a z-axis activity threshold;
d. storing the x-axis activity threshold, y-axis activity threshold, and z-axis activity threshold;
e. determining an x-axis filtered threshold value by adding the x-axis translated filtered acceleration value to the x-axis activity threshold;
f. determining a y-axis filtered threshold value by adding the y-axis translated filtered acceleration value to the y-axis activity threshold;
g. determining a z-axis filtered threshold value by adding the z-axis translated filtered acceleration value to the z-axis activity threshold; and
h. continually comparing the x-axis filtered threshold value to the x-axis translated raw acceleration value, the y-axis filtered threshold value to the y-axis translated raw acceleration value, and the z-axis filtered threshold value to the z-axis translated raw acceleration value.

15. The method of claim 14, further comprising the steps of
a. activating a timer when at least one of the x-axis translated raw acceleration value exceeds the x-axis filtered threshold value, the y-axis translated raw acceleration value exceeds the y-axis filtered threshold value, and the z-axis translated raw acceleration value exceeds the z-axis filtered threshold value;
b. determining a timer duration of the timer when at least one of the x-axis translated raw acceleration value does not exceed the x-axis filtered threshold value, the y-axis translated raw acceleration value does not exceed the y-axis filtered threshold value, and the z-axis translated raw acceleration value does not exceed the z-axis filtered threshold value, said timer duration comprising the duration that at least one of the x-axis translated raw acceleration value exceeded the x-axis filtered threshold value, the y-axis translated raw acceleration value exceeded the y-axis filtered threshold value, and the z-axis translated raw acceleration value exceeded the z-axis filtered threshold value;
c. storing one of a trigger activity event and a trigger inactivity event when the timer duration exceeds at least one of the x-axis activity duration, the y-axis activity duration, and the z-axis activity duration; and
d. updating an engine running status.

16. The method of claim 15, wherein at least one of the trigger activity event and the trigger inactivity event comprises storing specifics on which axis, the timer duration, and the time of the trigger event.

17. The method of claim 1, further comprising the steps of:
a. at least one 3-axis magnetometer communicating with the microcontroller of the inertial navigation sensor board, said microcontroller processing data from said 3-axis magnetometer;
b. calculating the mobile asset's pitch, wherein the mobile asset's pitch is determined by applying the equation:

$$\arctan\left(\frac{x - \text{axis translated filtered acceleration value}}{z - \text{axis translated filtered acceleration value}}\right);$$

c. calculating the mobile asset's roll, wherein the mobile asset's roll is determined by applying the equation:

$$\arctan\left(\frac{y - \text{axis translated filtered acceleration value}}{z - \text{axis translated filtered acceleration value}}\right);$$

d. calculating the mobile asset's speed, wherein the mobile asset's speed is determined by applying the equation:

$$\int \text{asset's acceleration}_{x\text{-axis translated filtered acceleration value}};$$

e. reading an x-axis gauss value, a y-axis gauss value, and a z-axis gauss value from the magnetometer; and
f. calculating a tilt compensation heading using the x-axis gauss value, the y-axis gauss value, the z-axis gauss value, the mobile asset's pitch, and the mobile asset's roll.

18. The method of claim 17, further comprising the steps of
a. at least one GPS sensor, onboard the mobile asset, receiving GPS signals from a global positioning system;
b. at least one 3-axis gyroscope communicating with the microcontroller of the inertial navigation sensor board, said microcontroller processing data from said 3-axis gyroscope;
c. determining when GPS signal is available the from the GPS sensor; and
d. parsing the mobile asset's GPS data into a speed, a heading, a latitude, and a longitude;
e. storing the latitude and longitude;
f. reading gyroscope data from a 3-axis gyroscope;
g. calculating a new position using the latitude, longitude, mobile asset speed, at least one of a wheel speed and data from the event data recorder, tilt compensation heading, and gyroscope data, the new position including a new latitude and a new longitude; and
h. storing the new latitude and new longitude.

19. The method of claim 17, further comprising the steps of:
a. at least one 3-axis gyroscope communicating with the microcontroller of the inertial navigation sensor board, said microcontroller processing data from said 3-axis gyroscope;
b. at least one GPS sensor, onboard the mobile asset, receiving UPS signals from a global positioning system;
c. determining the mobile asset's last known latitude and last known longitude from the GPS sensor;
d. storing the mobile asset's last known latitude and last known longitude;
e. reading gyroscope data from a 3-axis gyroscope;
f. calculating a new position using the last known latitude, last known longitude, mobile asset speed, at least one of a wheel speed and data from the event data recorder, tilt compensation heading, and gyroscope data, the new position including a new latitude and a new longitude; and
g. storing the new latitude and new longitude.

20. The method of claim 19, further comprising the steps of:
a. logging the time of the new latitude and longitude; and
b. sending departure and arrival alerts.

21. The method of claim 20, further comprising the steps of:
a. defining departure and arrival virtual trip wires;
b. detecting when the asset crosses the departure and arrival virtual trip wires;
c. logging the time the asset crosses the departure and arrival virtual trip wires; and
d. sending an alert when the asset crosses the departure and arrival virtual trip wires.

22. The method of claim 8, wherein the fuel level sensor is an ultrasonic level sensor,
a. said ultrasonic level sensor using ultrasonic acoustic waves to determine the distance between the sensor head and the fuel level.

23. The method of claim 1, wherein the event data recorder comprises at least one digital input and at least one analog input.

24. The method of claim 1, wherein the event data recorder comprises at least one pressure switch and at least one pressure transducer.

25. The method of claim 1, further comprising the step of:
a. at least one fuel level sensor measuring the amount of fuel inside a fuel tank.

26. The method of claim 1, further comprising the step of:
a. calibrating a compass on the mobile asset.

27. The method of claim 4, further including the steps of:
a. requesting a data log file from the event data recorder, said data log file covering at least one of the trigger event and the emergency brake event;
b. receiving the data log file; and
c. sending the data log file to the back office in real time.

28. The method of claim 10, further including the steps of:
a. requesting a digital video download covering the time of the trigger event from the digital video recorder;
b. receiving the digital video download; and
c. sending the digital video download to a back office.

29. The method of claim 18, further comprising the steps of:
a. logging the time of the new latitude and longitude; and
b. sending departure and arrival alerts.

30. The method of claim 29, further comprising the steps of:
a. defining departure and arrival virtual trip wires;
b. detecting when the asset crosses the departure and arrival virtual trip wires;
c. logging the time the asset crosses the departure and arrival virtual trip wires; and
d. sending an alert when the asset crosses the departure and arrival virtual trip wires.

31. A method for recording, processing and transmitting data from a mobile asset, comprising the steps of:
  a. at least one event data recorder, onboard the mobile asset, monitoring real-time status of at least one input sensor and logging data relating to the mobile asset;
  b. at least one digital video recorder onboard the mobile asset, recording still images, video and acoustics in real-time;
  c. at least one inertial navigation sensor board, onboard the mobile asset, said board comprising a microcontroller communicating with and processing data from a 3-axis accelerometer;
  d. establishing an x-axis acceleration duration, a y-axis acceleration duration, and a z-axis acceleration duration;
  e. establishing an x-axis acceleration threshold, a y-axis acceleration threshold, and a z-axis threshold predefined thresholds in three axes;
  f. reading an x-axis raw acceleration value, a y-axis raw acceleration value, and a z-axis raw acceleration value data from the 3-axis accelerometer;
  g. reading an x-axis gauss value, a y-axis gauss value, and a z-axis gauss value from a 3-axis magnetometer;
  h. reading an x-axis angular acceleration value, a y-axis angular acceleration value, and a z-axis angular acceleration value from a 3-axis gyroscope;
  i. filtering the x-axis raw acceleration value, y-axis raw acceleration value and the z-axis raw acceleration value into an x-axis filtered acceleration value, a y-axis filtered acceleration value, and a z-axis filtered acceleration value;
  j. translating the axes of the inertial navigation sensor board to the axes of the mobile asset and determining an x-axis translated raw acceleration value by translating the x-axis raw acceleration value to the axes of the mobile asset, determining a y-axis translated raw acceleration value by translating the y-axis raw acceleration value to the axes of the mobile asset, and determining a z-axis translated raw acceleration value by translating the z-axis raw acceleration value to the axes of the mobile asset;
  k. translating the axes of the inertial navigation sensor board to the axes of the mobile asset and determining an x-axis translated filtered acceleration value by translating the x-axis filtered acceleration value to the axes of the mobile asset, determining a y-axis translated filtered acceleration value by translating the y-axis filtered acceleration value to the axes of the mobile asset, and determining a z-axis translated filtered acceleration value by translating the z-axis filtered acceleration value to the axes of the mobile asset;
  l. determining an x-axis filtered threshold value by adding the x-axis translated filtered acceleration value to the x-axis acceleration threshold;
  m. determining a y-axis filtered threshold value by adding the y-axis translated filtered acceleration value to the y-axis acceleration threshold:
  n. determining a z-axis filtered threshold value by adding the z-axis translated filtered acceleration value to the z-axis acceleration threshold; and
  o. continually comparing the x-axis filtered threshold value to the x-axis translated raw acceleration value, the y-axis filtered threshold value to the y-axis translated raw acceleration value, and the z-axis filtered threshold value to the translated raw acceleration value.

* * * * *